United States Patent [19]

Schneider

[11] 4,452,919
[45] Jun. 5, 1984

[54] HIGH VELOCITY MIXING METHOD

[76] Inventor: Fritz W. Schneider, Erlenstrasse 1, Strasslach-Hailaring, Fed. Rep. of Germany, 8021

[21] Appl. No.: 372,061

[22] Filed: Apr. 26, 1982

Related U.S. Application Data

[60] Continuation of Ser. No. 165,015, Jul. 1, 1980, abandoned, which is a division of Ser. No. 29,669, Apr. 13, 1979, Pat. No. 4,239,732.

[51] Int. Cl.³ .................. B01J 14/00; B65D 5/56
[52] U.S. Cl. ................................ 521/99; 366/159; 366/189; 422/133; 422/224; 425/562; 521/82
[58] Field of Search ............... 366/96, 138, 159, 177, 366/136, 168, 172, 189; 422/133, 224, 135; 264/37, 240, 320, 321; 425/4 R, 4 C, 156, 562, 257; 239/117, 571, 579, 583; 137/115, 244; 222/135, 145, 318, 559; 521/82, 99

[56] References Cited

U.S. PATENT DOCUMENTS

| | | | |
|---|---|---|---|
| 2,850,990 | 9/1958 | Rasmusson . | |
| 2,885,268 | 5/1959 | Breer et al. . | |
| 2,890,836 | 6/1959 | Gusmer et al. | 239/117 |
| 3,099,045 | 7/1963 | Honkanen . | |
| 3,105,616 | 10/1963 | Krup | 222/129.2 |
| 3,111,271 | 11/1963 | Lofgren | 239/408 |
| 3,232,709 | 2/1966 | Cole . | |
| 3,263,928 | 8/1966 | Gusmer | 239/123 |
| 3,486,862 | 12/1969 | Unterstenhoefer | 422/133 |
| 3,590,813 | 7/1971 | Roszyk | 222/118 |
| 3,604,446 | 9/1971 | Brooks | 137/119 |
| 3,631,134 | 12/1971 | Scheuermann et al. . | |
| 3,674,398 | 7/1972 | Baumgartner et al. | 425/159 |
| 3,706,515 | 12/1972 | Keuerleber et al. | 425/257 |
| 3,784,169 | 1/1974 | Bockmann et al. | 137/563 X |
| 3,786,990 | 1/1974 | Hagfors | 239/112 |
| 3,788,337 | 1/1974 | Breer | 422/133 X |
| 3,799,199 | 3/1974 | Rumpff | 137/625.4 |
| 3,913,892 | 10/1975 | Ersfeld et al. | 425/4 R X |
| 3,926,219 | 12/1975 | Ersfeld et al. | 366/219 |
| 3,936,036 | 2/1976 | Fries . | |
| 3,960,506 | 6/1976 | Schmitzer | 366/138 |
| 4,013,391 | 3/1977 | Boden et al. | 366/159 |
| 4,043,486 | 8/1977 | Wisbey | 366/159 X |
| 4,070,008 | 1/1978 | Schlieckmann | 366/159 |
| 4,073,408 | 2/1978 | Hartwig | 222/318 |
| 4,082,512 | 4/1978 | Wingard et al. | 366/76 |
| 4,115,066 | 9/1978 | Muhle | 422/133 |
| 4,115,299 | 9/1978 | Muhle | 422/133 X |
| 4,126,399 | 11/1978 | Schneider et al. | 366/159 |
| 4,239,732 | 12/1980 | Schneider | 422/133 |

OTHER PUBLICATIONS

Schneider, J. Cellular Plastics, Nov./Dec. 1977, "Urethane Foaming Technique with High Pressure Units".
Schneider, "Polyurethan–Dosier–und Mischaggregate, Integration in Anlagenkonzepte", (Reprint of Speech May 1978 in Dusseldorf).
Schneider, "Polyurethan–Verschaumungsanlagen (Polyurethane Foaming Installations)" from Kunststoss Vararbeitungs Maschiner, Peter Haberstolz 1978.

Primary Examiner—Arnold Turk

[57] ABSTRACT

A mixing head for a high velocity reaction injection apparatus for mixing and dispensing two or more liquid components. The mixing head includes a mixing chamber with two or more inlets for the separate components and an outlet for dispensing the mixed components, and an injection housing for injecting each component through a corresponding inlet. Component flow is directed through a flow accelerating passage in the injection housing prior to injection into the mixing chamber, for imparting a pressure drop in the component on the downstream side of the passage, and means are provided for selectively blocking the inlets for terminating the dispensing of the mixed components and thereby increasing the component pressure in the injection housing downstream of the passage. A recirculation line communicates with each injection housing downstream of the passage, and means responsive to component pressure downstream of the passage directs the flow through the recirculation line when the mixing chamber inlet is blocked, and blocks the flow into the recirculation line when the inlet is open.

4 Claims, 8 Drawing Figures

HIGH VELOCITY MIXING METHOD

This is a continuation of application Ser. No. 165,015 filed July 1, 1980, now abandoned, which is a divisional of U.S. application Ser. No. 029,669, filed Apr. 13, 1979, and now U.S. Pat. No. 4,239,732.

FIELD OF INVENTION

The present invention relates to a mixing head for a high velocity reaction injection mixing and dispensing apparatus in which two or more liquid polymeric reactants, for example polyurethanes, are mixed and dispensed into a mold cavity or onto a surface.

BACKGROUND OF THE INVENTION

In high velocity injection mixing, two or more liquid components for forming a synthetic resin, for example a monomeric component and a catalyst, foaming, or blowing agent, are mixed thoroughly so that a uniform reaction occurs in a mold cavity or on a surface. The components must, however, be maintained separate until dispensing, since curing occurs quickly once mixed.

Foaming (mixing) of the reactants takes place by injecting the components under high pressure through separate opposed nozzle-containing inlets into a mixing chamber in a mixing head. The nozzle acts to accelerate the liquid component prior to injection into the mixing chamber to facilitate mixing. From the mixing chamber, the mixed reactants are dispensed through an outlet in the mixing head.

A mixing head of this type is used for injecting mixed reactants through port holes or gates in a closed mold cavity or for pouring into an open mold, which is thereafter closed. It may also be used for pouring or spraying onto open surfaces for making boards, sheet material, panels, or insulating layers, for example. In high velocity injection mixing, the mixing apparatus is often used for intermittent foaming, that is, the foam is dispensed in a shot-by-shot application. This is often the case in an assembly line setup, where the mixing head is placed over a mold, foam is applied to the mold and thereafter the mixing head is withdrawn. Between shots, the flow of the individual components to the mixing chamber is interrupted, stopping the foam output until the next mold is moved into place. The mixing chamber for this purpose usually is a cylindrical chamber. A hydraulically reciprocatable piston rod is disposed in the mixing chamber to move between a mixing position where components are injected through the opposed nozzles into the chamber and mixing takes place, and a blocking position where the piston rod blocks the nozzles and thus the flow of components into the mixing chamber.

Due to the stagnation of the flow in the mixing chamber, the mixed components tend quickly to clog the mixing head. Therefore, the mixing chamber must be cleaned between shots. However, stagnation of the flow of the individual components also occurs between shots. This tends to clog the delicate injection nozzle orifices and the flow passages, which can cause an improper mixture of components and thus a defective output, and eventually lead to blockage. Thus, frequent disassembly and cleaning of the mixing head is required.

In U.S. Pat. No. 3,706,515, a mixing head is shown and described for intermittent foaming in which, between shots, the mixing chamber is cleaned and the separate components are recirculated to prevent stagnation. A reciprocatable piston is movable between a mixing position in which the mixing chamber is open for injection of the separate components, and forward to a blocking position in which the mixing chamber is blocked. When in the blocking position, however, grooves formed in the piston connect the injection nozzles to recirculation lines. In addition, movement of the piston to the forward position scrapes the mixed reactants from the mixing cavity.

The device, however, possesses a number of shortcomings. When the piston is between the blocking and mixing positions in switching between recirculation and injection, the output nozzles are completely blocked. The piston thus must be moved quickly between positions and the recirculation grooves must have a long length extending to very near the front of the piston. This necessitates a long mixing head housing and requires a large, expensive hydraulic unit for reciprocating the piston.

The long length and speed of the piston movement renders the piston susceptible to freezing and scoring, especially if foreign particles, e.g. urea cyrstals, are present. This can be reduced to some extent if the mixing head parts are formed out of annealed and hardened high quality alloy steels, machined, ground, and finished to high precision. This, of course, is expensive.

Moreover, even if precision formed, a significant pressure fluctuation in the indivudual component pressure delivery systems occurs, which can cause the whole device to vibrate and shake, and can cause metering problems and lead/lag problems at the reinitiation of injection into the mixing chamber.

In certain applications, better mixing of the components occurs in a smaller mixing chamber, where the opposed nozzles are closely spaced. For effective recirculation, however, the grooves in the above-described device must be large enough in cross-section to offer little flow resistance. This dictates the size of the piston, which is then often too large for good mixing in these applications. Also, since the individual components are under high pressure, leakage from the lengthened piston grooves will occur without proper sealing. This requires precise dimensioning of the piston, cylinder and grooves along the entire length of the piston, as well as requiring seals along the piston to minimize intermixing of the reactive components. This is initially expensive. Also, the useful service life of the mixing head is short, since a minimum of normal wear causes fouling problems in the operation.

SUMMARY OF THE INVENTION

The present invention is a mixing head for a high velocity reaction injection apparatus for mixing and dispensing two or more liquid components which provides for continuous circulation of the individual reactants and for cleansing of the mixing chamber between shots, and which obviates the disadvantages of the prior art design set forth above.

More particularly, the mixing head has a housing defining the mixing chamber with two or more inlets for the separate components and an outlet for dispensing the mixed components. The incoming flow of each of the components under pressure is directed through a flow accelerating passage in an injection housing, and thereafter through one of the inlets into the mixing chamber. A nozzle is positioned either in the passage or in the mixing chamber inlet. The passage imparts a pressure drop to the fluid component flowing therethrough. A recirculation line communicates with each of the injection housings on the downstream side of the passage. Means are provided for selectively blocking the inlets for interrupting the delivery of the components and thereby increasing the fluid pressure of the component in each of the injection housings on the downstream side of the passage. Means are also provided responsive to the increased pressure in the injection housing for diverting the incoming flow to the corresponding recirculation line when the inlet is blocked and for interrupting the flow into the recirculation line when the inlet is open and the fluid is free to be injected into the mixing chamber.

Preferably the mixing chamber is cylindrical and contains a reciprocatable piston movable between a retracted mixing position in which the inlets open into the mixing chamber and an extended blocking position in which the inlets are blocked and the mixing chamber is scraped clean.

In one embodiment of the invention, each injection housing contains a reciprocatable plunger having a flow accelerating passage through which the incoming fluid flows. Fluid force on the inlet side of the plunger urges the plunger into an extended position when the mixing chamber inlet is open (when the counterforce on the downstream side of the plunger is relatively small due to the pressure drop across the passage). The fluid pressure rise on the downstream side of the plunger when the mixing chamber inlet is blocked urges the plunger to a retracted position. This occurs if the cross-sectional area of the plunger on the downstream side thereof is larger than the inlet side cross-sectional area, wherein with increased pressure on the downstream side of the plunger the force acting on the downstream side exceeds the opposing force on the upstream side thereof. Alternatively, a spring may be mounted in the injection housing so as to bias the plunger toward the retracted position.

In the extended position, the plunger is seated in the mixing chamber inlet opening so as to block the flow of the component into the recirculation line and direct the flow through the nozzle and into the mixing chamber. In the retracted position of the plunger, the component, flowing through the passage exits the injection housing through the recirculation line.

When the inlet is blocked, if the nozzle is located in the passage there is a continuous flow of fluid through the nozzle for flushing. If the nozzle is located in the mixing chamber inlet, fluid exiting from the passage, having an increased speed due to a reduced diameter portion therein, strikes the nozzle and flushes it from behind before exiting through the recirculation line. In either case, clogging is prevented.

Preferably, an adjustable stop is positioned in the injection housing for adjusting the retracted position of the plunger to limit plunger movement between the extended and retracted positions and to provide the desired gap between the plunger and the mixing chamber inlet opening when the plunger is retracted.

In another embodiment of the invention, incoming fluid is directed through a flow accelerating passage fixed in the injection housing. Thereafter, the fluid enters an internal cavity having one outlet opening into the mixing chamber and another outlet communicating with the recirculation line. The flow accelerating passage imparts a pressure drop to the flowing component. A relief valve is arranged in the recirculation line and is normally closed when the inlet to the mixing chamber is open and there is relatively little pressure in the internal cavity on the downstream side of the passage. When the inlet to the mixing chamber is blocked, however, the pressure on the downstream side of the passage builds up, thereby opening the relief valve to permit the component to flow back through the recirculation line and into the component reservoir. As in the previous embodiment, the nozzle may be contained either in the passage or in the opening into the mixing chamber. In other embodiments of the invention, a nozzle formed with a fixed opening mounted in the mixing chamber inlet may be replaced by a needle valve supported in the injection housing and extendable into the inlet so as to provide an adjustable nozzle opening.

For a better understanding of the invention, reference is made to the following detailed description of the preferred embodiments taken in conjunction with the appended drawings.

DETAILED DESCRIPTION OF THE PREFERRED EMBODIMENTS

Figure 1:
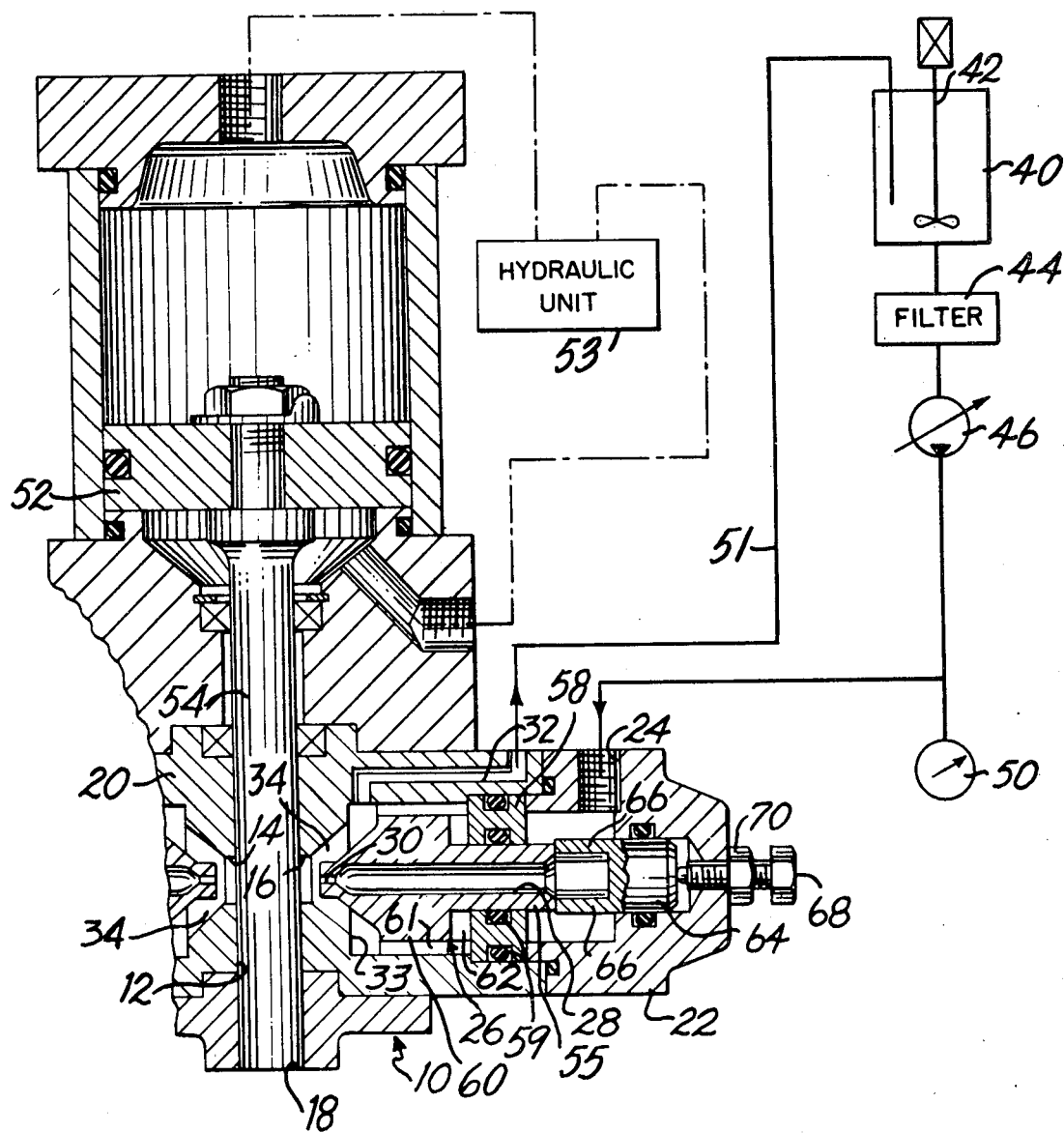
FIGS. 1 and 2 are sectional views of a mixing head according to the invention for mixing and dispensing two liquid reactive components in the recirculation and mixing configurations, respectively, portions of the supply and recirculation circuitry being shown in schematic form.
Figure 2:
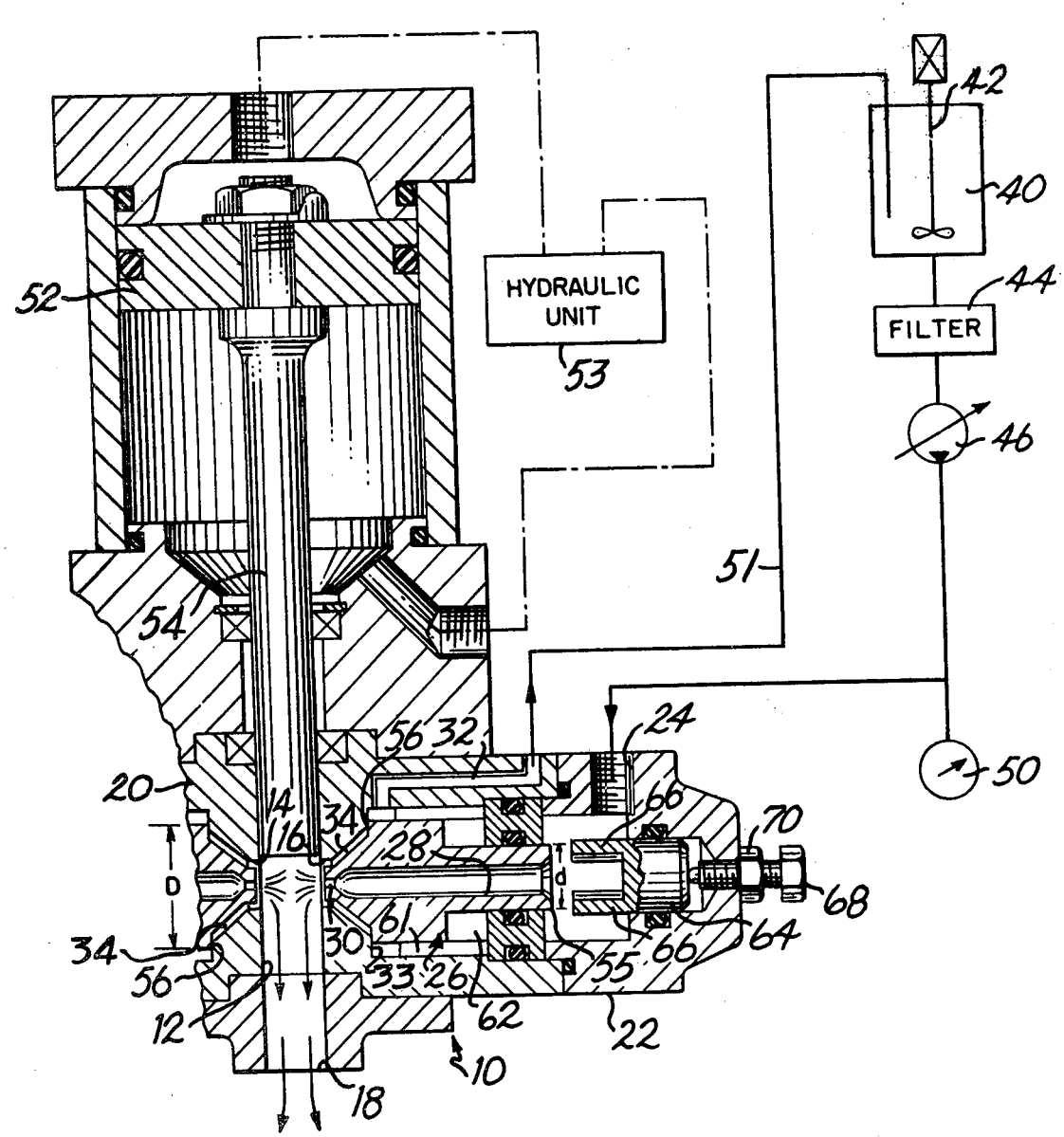

Referring to FIGS. 1 and 2, a mixing head housing 10 includes a mixing chamber 12 (FIG. 2) having a pair of inlet openings 14, 16 and an outlet 18 for dispensing mixed foam. A pair of identical injection housings 20 and 22 communicate with the inlet openings 14 and 16, respectively, for injecting the separate reactants into the chamber 12. The reactive chemicals to be mixed in the chamber 12 may be isocyanate and polyol, for example. Inasmuch as the housings 20 and 22 and the respective reactant delivery systems are identical, only the housing 22 and its delivery system will be described in detail.

The injection housing 22 includes an inlet passage 24 for its reactive component and a reciprocatable plunger 26 having a passage 28 therethrough. A nozzle 30 is formed in the plunger 26 at the outlet end of the passage 28, so that the component flowing through the passage is accelerated through the nozzle. A recirculation outlet 32 extending through the wall of the housing 22 communicates with an annular groove 33 formed in the interior wall of the housing 22, and the groove 33 communicates with a chamber 34 downstream of the plunger 26 when the mixing chamber 12 is blocked (see FIG. 1), as described below.

The reactive component is contained in a temperature controlled reservoir 40, which includes a mechanical agitator 42 to prevent stagnation. The component is fed through a filter 44 to a metering pump 46. The filter may be a so-called plate-block filter with scraper knives in the slots which can be cleaned under operating conditions. The cleaning is done either manually or automatically. The pump 46 provides a delivery pressure of about 130–200 atmospheres (1,950–3,000 psi.), depending upon operating requirements. For this purpose, an axial piston pump, driven by a constant speed motor, is used. Volume output is controlled by varying the stroke length of the pistons to provide exact metering at high pressure. The component is pumped into the inlet 24 of the injection housing 22. A pressure monitor device 50 registers the pressure of the component supplied to the housing 22. During the recirculation mode the component is returned from the recirculation outlet 32 to the reservoir 40 through a recirculation line 51.

A piston rod 54, driven by a piston 52 by means of a conventional hydraulic unit 53, may be reciprocated between a retracted mixing position (FIG. 2), in which the inlets 14 and 16 are open and the components may be injected into the mixing chamber 12, and an extended (blocking) position (FIG. 1). In the mixing position (FIG. 2), the incoming fluid component is directed through the passage 28, accelerated through the nozzle 30, and injected into the mixing chamber 12. Due to the pressure drop across the passage 28 and nozzle 30, the pressure on the downstream side of the plunger 26 (in the chamber 34) is considerably lower than on the upstream side thereof. Therefore, fluid pressure upstream of the plunger 26, which acts on the necked-down portion 55 thereof, having a diameter "d", urges the plunger toward an extended position, wherein it is seated at its periphery, at 56. Flow of the reactive component to the annular groove 33 is blocked by the seat 56 and thereby flow to the recirculation line 51 is prevented.

When the piston rod 54 moves to the blocking position (FIG. 1), pressure in the chamber 34 on the downstream side of the plunger 26 instantly increases, applying a retracting force on the downstream face of the plunger 26, the cross section of which has a diameter "D". This cross section of the downstream side of the plunger 26 is larger than the cross section of the plunger necked-down portion 55, and as the pressure in the chamber 34 increases, the force urging the plunger 26 to the retracted position (FIG. 1) increases and instantly exceeds the opposing force on the plunger portion 55. The plunger thus moves to the retracted position (FIG. 1), whereby fluid in the chamber 34 immediately flows into the annular groove 33, recirculation outlet 32 and the recirculation line 51, and thence to the reservoir 40. During recirculation, the nozzle 30 is flushed and rinsed by the component flowing therethrough.

The relative diameters "D" and "d" are chosen so that the plunger 26 moves to the retracted position without causing a severe pressure rise or surge in the fluid delivery system. The diameters are chosen such that $D^2/d^2$ is equal to or greater than $1/n$, where "n" is the efficiency factor of the nozzles including flow restrictions in adjacent portions and mechanical friction forces.

The downstream diameter "D" may be smaller relative to the upstream diameter "d" if the nozzle 30 is located in the mixing chamber inlet (e.g. FIGS. 3-4) than if the nozzle is in the plunger passage 28 (e.g. FIGS. 1-2), since, when the inlet 16 is open, the downstream pressure and thus the retracting force on the plunger is greater in the former case than in the latter case, where the downstream pressure is close to zero if the mixed components are dispensed into an open mold or are sprayed onto a surface.

The plunger necked-down portion 55 is slidably received in an annular guide 58 mounted in the housing 22, the guide having conventional hydraulic seals 59 between the guide and the housing, and between the guide and the plunger portion 55. The larger diameter portion 60 of the plunger 26 is slidably received in a sleeve 61 formed with axially extending slots to permit venting between the chamber 34 and a chamber 62 between the plunger portion 60 and the guide 58, such that the plunger 26 is free to reciprocate.

An adjustable stop 64 limits the retraction of the plunger 26 and thus determines the outflow gap between the downstream side of the plunger and the facing interior wall of the housing 22. The stop 64 has a pair of depending arms 66 to permit the flow of incoming fluid therebetween into the passage 28 of the plunger 26 when the plunger is retracted and rests against the arms (FIG. 1). The stop 64 is adjustable by a screw 68, which may be locked in the desired position by a locking nut 70. The stop 64 is adjusted to establish an outflow gap such that the system pressure (indicated on the gage 50) during the recirculation mode equals that during the mixing mode. Thus, the plunger 26 acts as a throttle valve during recirculation.

Figure 3:
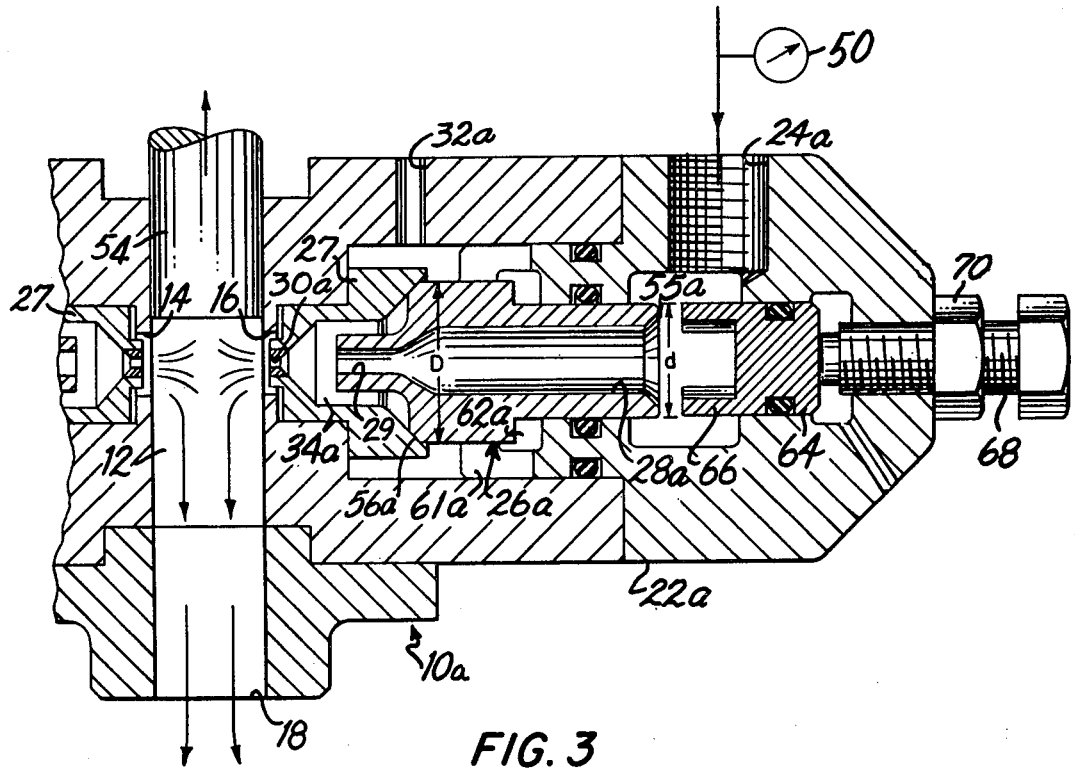
FIGS. 3 and 4 are sectional views of another embodiment of a mixing head in the recirculation and mixing configurations, respectively.
Figure 4:
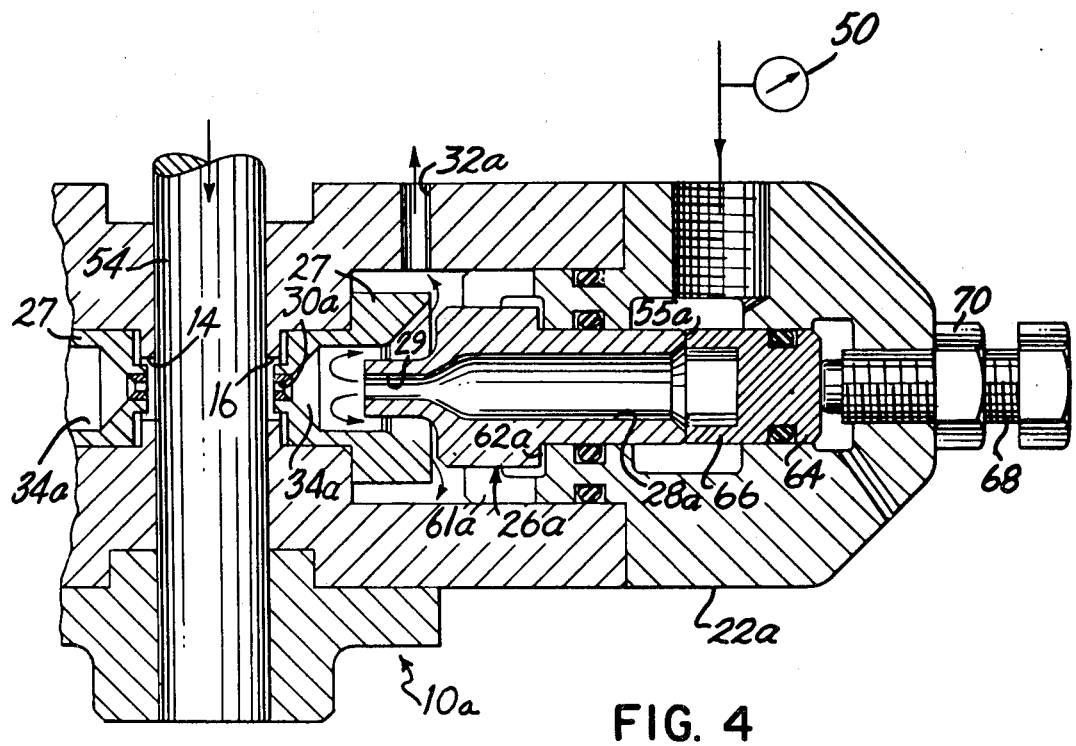

Referring to FIGS. 3 and 4, the mixing head 10a has a housing defining a mixing chamber 12 with a pair of inlet openings 14 and 16 and an outlet 18 for dispensing mixed foam. The injection housing 22a has an inlet 24a for the liquid component and a reciprocatable plunger 26a guided in a sleeve 61a, which has axial slots to vent the chamber 62a. The plunger 26a has a passage 28a therethrough that includes a reduced diameter portion 29 for accelerating the component into a chamber 34a in the injection housing 22a. A sleeve 27 is press fit in the housing 22a and retains a nozzle 30a in the opening 16.

When the piston rod 54 is retracted to open the mixing chamber inlets 14, 16, the liquid component flows between the legs 66 of the stop 64 and into the passage 28a of the plunger 26a. Due to the pressure drop of the fluid as it flows through the passage 28a, the pressure upstream of the plunger 26a is greater than that downstream thereof, and the resultant force acts on the necked-down portion 55a to push the plunger to the extended position (FIG. 3), in which the plunger is seated at its periphery, at 56a, against the sleeve 27. The fluid component is accelerated through the passage portion 29 and is additionally accelerated through the nozzle 30a into the mixing chamber 12.

When the piston rod 54 is extended to the blocking position (FIG. 4) the pressure rise in the chamber 34a acts on the downstream side of the plunger 26a, the cross section of which has a diameter D, which is greater than the diameter d of the necked-down portion 55a, so that the resultant force drives the plunger to the retracted position (FIG. 4). The diameter "D" is chosen relative to the diameter "d" as described above in connection with the embodiment of FIGS. 1 and 2. The component is accelerated by the passage portion 29 against the nozzle 30a, so that the nozzle is flushed and rinsed by the component, which thereafter is recirculated through the recirculation outlet 32a to the reservoir (not shown).

Figure 5:
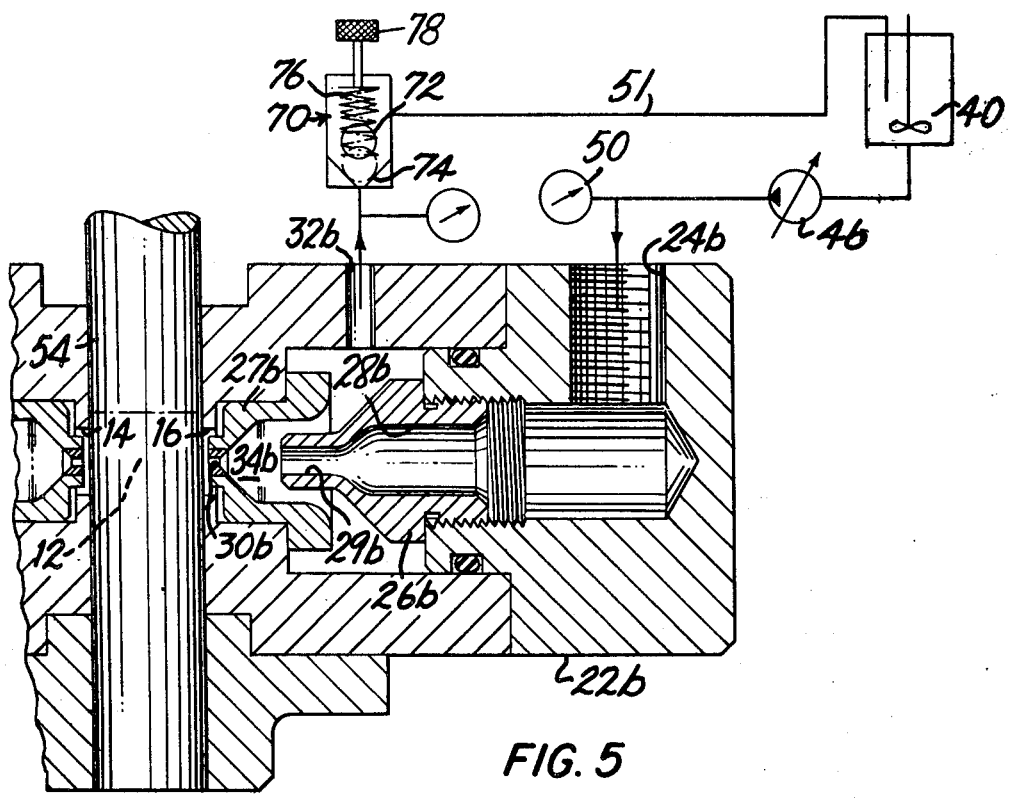
FIGS. 5–8 are sectional views of other embodiments of the invention.

Referring to FIG. 5, the fluid component from the reservoir 40 is pumped by the pump 46 into the inlet 24b of the injection housing 22b and through the flow accelerating passage 28b (including its reduced diameter portion 29b) of a fixed sleeve 26b, and thereafter into a chamber 34b. The chamber 34b communicates with the mixing chamber inlet 16 and with the recirculation outlet 32b during both the mixing and the recirculation modes. A nozzle 30b is mounted in a fixed sleeve 27b so that the nozzle is disposed in the mixing chamber inlet 16. An adjustable pressure relief valve 70 is interposed in the recirculation line 51. When the piston rod 54 blocks the inlet 16 (shown in full), the pressure rise in the chamber 34b lifts the ball 72 from the socket 74 against the biasing force of the spring 76 to permit recirculation to the reservoir 40. The force of the spring 76 is adjusted by the screw 78 so that the delivery system pressure indicated by the gage 50 during the recirculation mode equals that during the mixing mode. During recirculation, the nozzle 30b is flushed by the component accelerated thereagainst through the reduced diameter portion 29b.

When the mixing chamber inlet, however, is open and the component is injected into the mixing chamber 12, the pressure in the chamber 34b decreases due to the flow through the nozzle 30b. The drop in pressure in the chamber 34b causes the spring 76 to seat the ball in the socket 74 (shown in phantom) to close the recirculation line 51, and therefore the liquid component is directed through the nozzle 30b into the mixing chamber 12.

Figure 6:
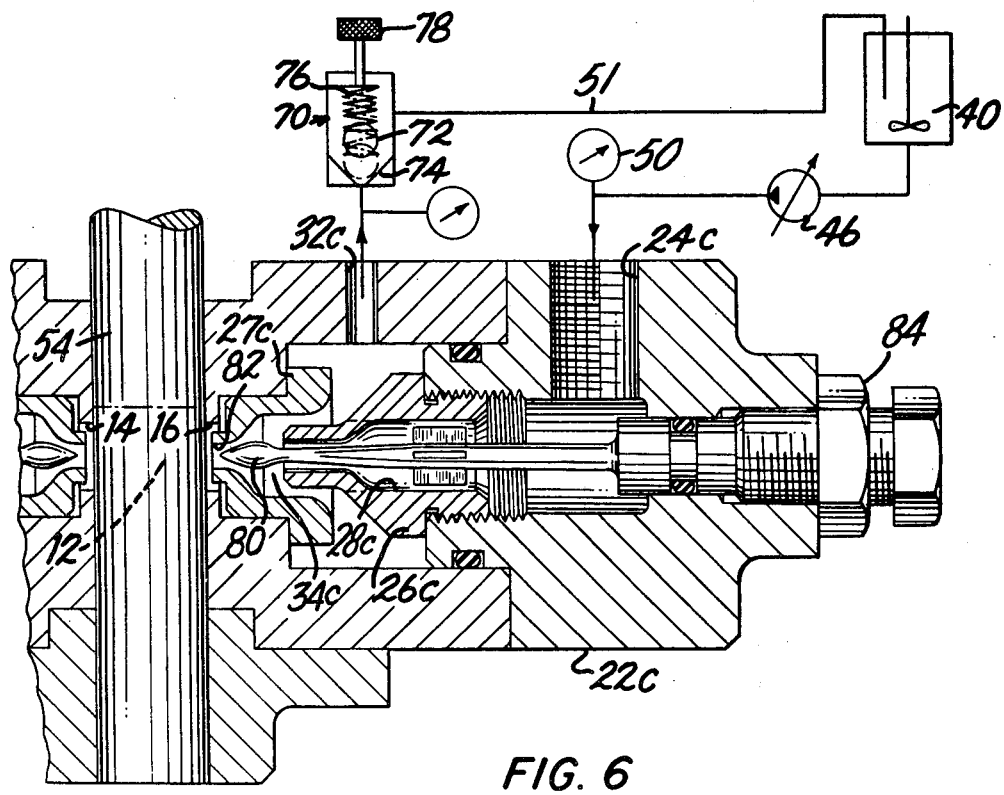

A modification of the embodiment of FIG. 5 is illustrated in FIG. 6, with like features having like reference numerals, a "c" being added to the numerals in FIG. 6. The component is pumped through the inlet 24c of the injection housing 22c and through a flow accelerating passage 28c of a fixed sleeve 26c and thereafter into a chamber 34c in the housing 22c. The chamber 34c communicates both with the inlet 16 and with the recirculation outlet 32c and the recirculation line 51, which has a relief valve 70 as described above. The nozzle 30b (having a fixed opening) in the inlet sleeve 27b (FIG. 5) is replaced by an adjustable nozzle arrangement including a needle 80 that is displaceable into and out of the opening 82 of the sleeve 27c. The needle 80 is mounted in the housing 22c and may be retained in the desired position by a lock nut 84 so as to obtain the desired effective nozzle opening.

Figure 7:
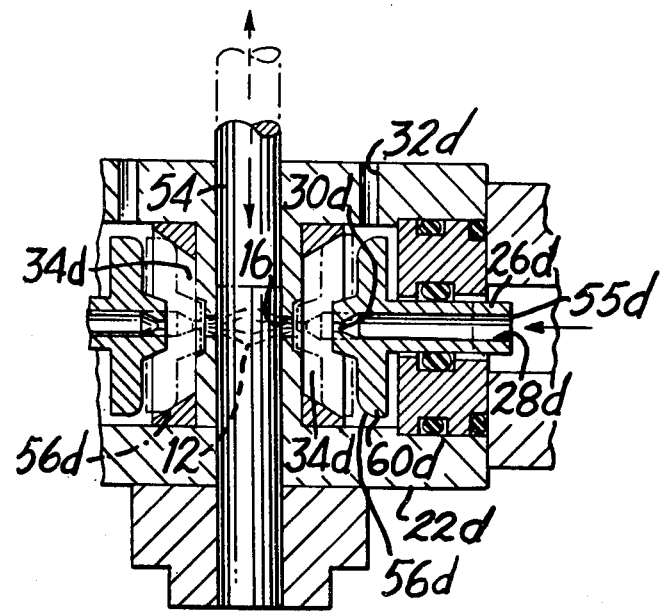

Referring to the embodiment shown in FIG. 7, the fluid component entering into the injection housing 22d is directed through a flow accelerating passage 28d in a reciprocatable plunger 26d, either into the mixing chamber 12 when the inlet 16 is open, or through recirculation outlet 32d to the recirculation line (not shown) when the inlet is blocked. A nozzle 30d is formed in the outlet of the passage 28d. In this embodiment, the enlarged end 60d of the plunger 26d, which has a greater cross-sectional area than the necked-down portion 55d thereof, is freely mounted in the chamber 34d to be movable between a retracted position (in full) when the mixing chamber inlet 16 is blocked and an extended position (in phantom) when the piston rod 54 is retracted and the inlet 16 is open. In the extended position, the plunger 26d is seated at its periphery, at 56d, so that the recirculation outlet 32d is blocked and the fluid component is directed entirely into the mixing chamber 12. The retracted position of the plunger 26d is determined by an adjustable stop (not shown).

Figure 8:
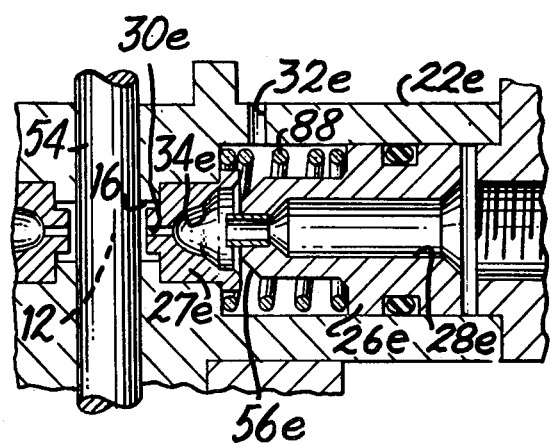

In the FIG. 8 embodiment, the fluid component is directed through a flow accelerating passage 28e of a reciprocatable plunger 26e and thereafter through a nozzle 30e in a fixed sleeve 27e and through the inlet 16 when the inlet is open, or through the chamber 34e and the recirculation outlet 32e when the inlet 16 is blocked by the piston rod 54, as shown in FIG. 8. In this embodiment, the cross-sectional area of the plunger 26e at the upstream side thereof is approximately the same as at the downstream side thereof. A spring 88 is mounted between the housing 22e and the downstream side of the plunger 26e to urge the plunger to the retracted position. When the piston rod 54 is retracted to open the inlet 16, the force acting on the upstream side of the plunger 26e exceeds the opposing force of the spring 88 and the force resulting from the pressure in the chamber 34e, and the plunger is moved to the extended position where it is seated against the sleeve 27e. When the piston rod 54 is moved to the blocking position, however, the pressure increase in the chamber 34e applies additional retracting force on the plunger 26e, which with the force of the spring 82 push the piston to the retracted position (shown in FIG. 8), whereupon the liquid component exiting the passage 28e flows through the recirculation outlet 32e. An adjustable stop (not shown) determines the retracted position, and thus the throttling effect of the plunger 26e, so that the system pressure during recirculation can be adjusted to equal that during mixing.

In all of the above-described embodiments, the flow of each fluid component is directed through a nozzle into the mixing chamber whenever the inlet to the mixing chamber is open. At the instant that the inlets are blocked, the flow of the components through the mixing head is interrupted only for the instant that it takes for a very slight pressure build up either to retract the plungers slightly and thereby open the recirculation lines, or in the case of the embodiments shown in FIGS. 5 and 6, to open the relief valves. In practice, only a very small plunger or relief valve movement is required for recirculation to be initiated, and therefore in either type of recirculation arrangement, a negligible pressure rise will be experienced in the system when switching between the mixing configuration and the recirculation configuration.

Also, in all of the illustrated embodiments, the movement of the piston rod 54 from the open position to the blocking position scrapes all the residual mixed foam from the mixing chamber 12 and ejects it from the outlet 18 of the mixing chamber.

In an example similar in construction to the embodiment of FIG. 7, reactive urethane components were metered, mixed, and dispensed at a ratio of polyol to isocyanate of approximately 1:1. The nozzle in each injection unit had an opening of 0.03 inch, and each reactant, delivered at 2000 psi., was pumped through its nozzle at 0.87 gallon per minute. Each of the plungers had an upstream diameter, "d", of 5/16 inch, and a downstream diameter, "D", of 1⅛ inch. In repeated operation of the mixing head, in which the mixing chamber inlets were blocked and opened to switch between the recirculation and the mixing modes, there were no pressure changes in the delivery system observed on the gages 50.

The embodiments which have been described above are merely illustrative of the present invention. Variations and modifications of the preferred embodiments will be apparent to those skilled in the art without departing from the inventive concepts disclosed in the specification. All such variations and modifications are intended to be within the scope of the present invention, as defined in the following claims.

I claim:

1. A method of mixing a plurality of reactive components in a mixing head having a mixing chamber with an inlet for each component and an outlet for the mixed components, and a reciprocatable piston disposed in said chamber and movable between a retracted position in which the inlets are open and an extended position in which the inlets are blocked, comprising the steps of:

(a) supplying each component under pressure to an injection housing, through a passage therein for each component, wherein each passage has an outlet arranged to direct the respective component at one said inlet for introduction into said mixing chamber;

(b) directing each component, prior to entering said mixing chamber, through a nozzle for accelerating said components prior to delivery into the mixing chamber, said nozzle receiving its component from said passage;

(c) selectively moving said piston to block the inlets to prevent flow therethrough to thereby interrupt mixing;

(d) said blocking of each inlet producing an increase in pressure of the component downstream of said passage to thereby divert the flow to a recirculation system connected to each injection housing without interrupting the component delivery through said passages and to said inlets; and (e) selectively retracting said piston to open said inlets to simultaneously cease recirculation and re-institute mixing, wherein mixing is re-instituted without interrupting the component delivery through said passages.

2. A method according to claim 1, wherein each nozzle is disposed in its respective inlet, and including the step of flushing each nozzle with the recirculating component when the inlets are blocked by accelerating the component in said passage and directing said component from said passage against said nozzle.

3. A method according to claim 1, wherein each nozzle is disposed in said passage and including the step of flushing each nozzle with the recirculating component when the inlets are blocked by directing the component through the nozzle, prior to recirculation.

4. A method according to claim 1, 2, or 3, wherein each passage is contained in a reciprocatable plunger, and comprising the step of retracting said plungers, responsive to blockage of said inlets, to communicate said injection housing to said recirculation system, for switching over from mixing to recirculation.

* * * * *